United States Patent [19]

Tremblay et al.

[11] Patent Number: 5,748,935

[45] Date of Patent: May 5, 1998

[54] RECONSTRUCTION OF YOUNG BITS IN ANNEX AFTER MISPREDICTED EXECUTION BRANCH IN PIPELINED PROCESSOR

[75] Inventors: Marc Tremblay, Palo Alto; Krishna C. Yarlagadda, San Mateo, both of Calif.

[73] Assignee: Sun Microsystems, Inc., Palo Alto, Calif.

[21] Appl. No.: 752,950

[22] Filed: Nov. 20, 1996

Related U.S. Application Data

[63] Continuation of Ser. No. 378,659, Jan. 26, 1995, abandoned.
[51] Int. Cl.$^6$ ...................................................... G06F 9/38
[52] U.S. Cl. ........................... 395/392; 395/393; 395/394
[58] Field of Search ...................................... 395/394, 384, 395/392, 393

[56] References Cited

U.S. PATENT DOCUMENTS

| | | | |
|---|---|---|---|
| 4,594,660 | 6/1986 | Guenthner et al. | 395/250 |
| 4,862,412 | 8/1989 | Fried et al. | 365/49 |
| 5,173,872 | 12/1992 | Crawford et al. | 365/49 |
| 5,226,126 | 7/1993 | McFarland et al. | 395/375 |
| 5,339,268 | 8/1994 | Machida | 365/49 |
| 5,345,569 | 9/1994 | Tran | 395/375 |
| 5,369,605 | 11/1994 | Parks | 364/715.09 |
| 5,396,448 | 3/1995 | Takayanagi et al. | 365/49 |
| 5,442,757 | 8/1995 | McFarland et al. | 395/375 |
| 5,454,117 | 9/1995 | Puziol et al. | 395/800 |
| 5,463,745 | 10/1995 | Vidwans et al. | 395/375 |
| 5,471,591 | 11/1995 | Edmondson et al. | 395/375 |
| 5,487,156 | 1/1996 | Popescu et al. | 395/375 |
| 5,519,864 | 5/1996 | Martell et al. | 395/650 |
| 5,524,262 | 6/1996 | Colwell et al. | 395/800 |

(List continued on next page.)

FOREIGN PATENT DOCUMENTS

0164 A1  9/1994  European Pat. Off. .......... G06F 9/38

OTHER PUBLICATIONS

"The MetaFlow Architecture", Val PoPeSCU Jun. 1991 pp. 64–65.
G.S. SOHI: "Instruction Issue Logic for High-Performance, Interruptible, Multiple Functional Unit, Pipelined Computers", IEEE Transactions on Computers, vol. 39, No. 3, Mar. 1990, New York, NY, pp. 349–359, XP000103439.
M.D. Smith et al: "Boosting Beyond Static Scheduling in a Superscalar Processor", Proceedings of the 17th Annual International Symposium on Computer Architecture, May 28–31, 1990, Seattle, WA, pp. 344–354, XP000144785.

*Primary Examiner*—Krisna Lim
*Assistant Examiner*—Saleh Najjar
*Attorney, Agent, or Firm*—Limbach & Limbach

[57] ABSTRACT

In a pipelined processor, a method and apparatus for performing restoration of the previous values of young bits in the annex after a mispredicted branch has been detected. In a first embodiment, beginning with the oldest annex entry, the destination register address of that entry is broadcast to all other entries. All annex entries with matching addresses have their young bits reset, while the young bits of the broadcast entry is set. The above broadcast, compare, reset, and set operations are performed on all the remaining valid entries sequentially and in order of decreasing age. When all valid entries have been broadcast, the young bit states are correctly reconstructed. In a second embodiment, each annex entry has a current young bit Y0 and one or more past young bits (Y1 through YN). For branch condition resolutions which take up to N clock cycles, N past young bits are maintained in each annex entry. During every machine cycle in which a new annex entry is received, the contents of Yk is shifted to Yk+1 for all k from 0 to N−1, and the current young bits Y0 are updated. When a mispredicted branch is detected after the results of i speculative instructions have been entered in the annex, the past young bit Yi is restored back into the current young bit Y0 for each annex entry. Thus, restoration of the correct young bits is performed in a small constant time. Both embodiments may be implemented in the same processor to optimize recovery from both short and long latency mispredictions.

20 Claims, 7 Drawing Sheets

U.S. PATENT DOCUMENTS

| | | | |
|---|---|---|---|
| 5,535,346 | 7/1996 | Thomas, Jr. | 395/375 |
| 5,548,776 | 8/1996 | Colwell et al. | 395/800 |
| 5,561,776 | 10/1996 | Popescu et al. | 395/375 |
| 5,584,038 | 12/1996 | Papworth et al. | 395/800 |
| 5,592,636 | 1/1997 | Popescu et al. | 395/386 |
| 5,613,083 | 3/1997 | Glew et al. | 395/417 |

RECONSTRUCTION OF YOUNG BITS IN ANNEX AFTER MISPREDICTED EXECUTION BRANCH IN PIPELINED PROCESSOR

This is a continuation of application Ser. No. 08/378,659 filed Jan. 26, 1995 now abandoned.

BACKGROUND OF THE INVENTION

1. Field of the Invention

The present invention relates to microprocessor design. Specifically, the present invention relates to recovery from mispredicted branches of speculatively executed instructions in a pipelined processor.

2. Discussion of the Prior Art

A typical early microprocessor included a central processing unit (CPU) which implemented a machine capable of interfacing with memory and serially executing a sequence of instructions. The instruction execution was typically broken into at least four major stages: instruction and operand fetch, instruction decode, execution, and write back of results into the destination registers. A typical instruction took one clock cycle to execute, so that each of the four functions was performed in that cycle. Each stage had to wait for the results from the previous stage before its work could be accomplished. Thus, the instruction execution propagated through each of the four stages in order. The minimum clock period was then determined by the longest possible propagation delay through all four stages.

The concept of pipelining increased the maximum clock frequency by reducing the amount of logic performed in each clock cycle. To facilitate this, for example, the interface between the second and third stages could be separated by clocked latches. The first two stages (fetch and decode) would be performed in one clock cycle. Subsequently, during a second clock cycle, the last two stages (execution and write back) would be performed. Here, the overall latency of an instruction might remain approximately the same since the total amount of time from the beginning of the fetch to the end of the write back would be approximately the same. However, separating the instruction execution into two distinct pieces has the important advantage that the throughput could be increased by as much as a factor of two. This is a result of the fact that the pipelined CPU can operate on two instructions simultaneously. While the execution and write back of one instruction is being performed, the fetch and decoding of a second instruction can be performed. Quite naturally, this pipelining concept can be extended such that each of the four stages is performed in a separate clock cycle, thus increasing the throughput accordingly. Thus, by dividing the logic into N separate segments, the throughput can theoretically be increased by a factor of N.

Superpipelined designs break up the logic in some or all of the four stages so as to reduce the maximum propagation delay through any one stage, and thus increase the operating frequency and throughput as the instruction execution is broken into more than four pipeline stages. A superscalar microprocessor has more than one execution unit 10 (also called a functional unit) as shown in FIG. 1.

A superscalar processor has several parallel functional units 10. Typical superscalar processors include floating point, integer, branch, and load/store functional units. Typically, among the functional units 10 are units which can perform floating point calculations or similar complex operations. It is desirable to run these complex functional units at the same clock frequency as the rest of the hardware, while still allowing for each functional unit to begin executing a new instruction every cycle. To accomplish these objectives, pipelining of the parallel functional units 10 is desirable. The complexity and logical partitioning of the most complicated functional unit dictates the number of pipeline stages necessary in that functional unit. Not all of the functional units 10 have the same latency. Of these four parallel functional units 10, the floating point unit will probably turn out to have the most complexity. Because the other three types of functional units are not as complex, it is possible to pipeline these other functional units into fewer stages than are required for the pipelining of the floating point unit. All of the parallel functional units 10 merge back into the final write back stage 11 in which the results of the executions are written into their respective destination registers.

If the pipeline for every parallel functional unit 10 is not the same number of stages, then the results from some functional units 10 will be available sooner than others. For example, if the pipelining of the floating point unit requires five stages, while the pipelining for the integer unit only takes two stages, then the results from the integer unit would be available three clock cycles prior to the results of the floating point unit even though both instructions were dispatched concurrently. By the same token, "younger" instructions can finish sooner than older instructions. For example, during one clock cycle, a floating point instruction is dispatched, and during the next subsequent clock cycle, an integer instruction such as an addition is dispatched. If the integer pipeline is three stages shorter than the floating point pipeline, the integer addition result will be available two clock cycles before the floating point result even though the floating point instruction was dispatched first. In this example, the integer addition was a "younger" instruction because it was dispatched later than the "older" floating point instruction.

If some younger instructions are allowed to write into the destination registers before some older instructions, potential problems arise. For example, if both instructions write to the same destination register, the programmer expects the younger instruction to write over the results of the older instruction. If in fact, the older instruction writes over the results of the younger instruction, the processor has not correctly executed the sequential program since the intended result does not appear in the intended destination. Therefore, it is important to maintain the sequential nature of instruction result writeback.

In order to facilitate sequential write-back of instruction results, shorter functional unit pipelines are lengthened with extra pipeline stages so that all functional units 10 have the same latency from dispatch to write back. In shorter functional unit pipelines, this results in several extra stages being added to the end of the functional unit pipeline, as depicted in FIG. 2. These additional pipeline stages effectively form a first-in-first-out (FIFO) buffer 20, sometimes referred to as a completion unit, which will herein be referred to as an annex 20.

Although preserving the sequential nature of the program execution and write-back, the addition of the extra stages in the pipelines of the shorter functional unit pipelines creates additional complications. Assume the shorter functional unit 21 in FIG. 2 is an integer ALU functional unit which might be used to execute a sequence of instructions. For example, consider the following program fragment where add rs1,rs2, rd denotes that the contents of register rs1 and the contents of register rs2 should be added and the result should be stored to register rd.

add r1,r2,r3;
add r3,r4,r5;

Here, the first instruction creates a result for register r3. The very next instruction uses the value for r3 that was computed by the previous instruction. Unfortunately, however, the value of r3 which was calculated by the first instruction has not been written into the register file by the time the second instruction begins execution. The destination register in the register file is not finally updated until the write-back stage 22 is reached at the end of the annex 20. Therefore, the correct operand of the second instruction is resident in the first entry 23 of the annex 20 when the second instruction is executing. In order to allow the entries of the annex 20 to be utilized by subsequent instructions, some access to the annex 20 must be provided.

FIG. 3 depicts one way that access to the annex 30 is provided in the prior art. Each entry in the annex 30 has a set of outputs 31 which is fed back to at least one multiplexor 32 which selects either the value fetched from the register file or the value from one of the entries in the annex 30. If an entry in the annex 30 contains the most up-to-date or "youngest" version of a variable which needs to be used as an operand in a current instruction, that entry can be selected by the multiplexor 32 to provide the input to the functional unit.

When each entry of the annex 30 is fed back to a multiplexor 32 at the beginning of each functional unit 33, the width of the datapath 34 can increase substantially because the number of feedthroughs increases directly proportional to the number of entries in the annex 30. Since each entry in the annex 30 has its own set of wires 31 connecting back to the multiplexor 32 before the functional unit 33, a total of N extra wires per bit in the datapath width must pass through the functional unit 33 for an N-entry annex 30. If the hardware has 64-bit wide architecture and has an eight-deep annex, this means that 512 extra wires must be routed through or fed-through the functional unit 33. Since each wire takes up some non-zero amount of space, the overall width of the functional unit 33 must be increased substantially. In order to avoid a "waterfall routing" situation which increases the size of the datapath 34 enormously, the pitch or width of each entry of the annex 30 must similarly be increased to match the pitch of the functional unit 33. Thus, the entire datapath is widened by the addition of the feedthroughs. Widening of the datapath is undesirable for at least two reasons. First, it consumes more valuable area on the integrated circuit. Secondly, by making the datapath wider, the control signal wires are longer. Since the resistance of wires is not negligible with modern small feature size processes, longer wires are also slower, and thus can constrain performance.

A second disadvantage of feeding back the entries 30 to a multiplexor 32 is that the multiplexor 32 becomes slower as the number of inputs increases. For each entry in the annex 30, an additional input to the multiplexor must be provided. To make matters worse, a superscalar processor, with several pipelined functional units may have multiple annexes. Since the youngest entry may be in any annex 30, the multiplexor 32 must have an input for every possible entry in any of the annexes. If too many inputs to the multiplexor are added, the multiplexor becomes too slow to incorporate into the cycle dedicated to execution, and the maximum operating frequency is reduced.

Using this method, some capability must be provided to determine which register addresses are stored in each entry of the annex 30 in order to determine which entry, if any, should be selected by the multiplexor 31.

A more advantageous prior art method involves the use of a memory 40 to implement the annex as depicted in FIG. 4 and disclosed in "United States Patent Application For Temporary Pipeline Register File For A Superpipelined Superscalar Processor," Ser. No. 08/153,814, assigned to the same assignee as the present invention. Instead of feeding through each entry of the annex, only one set of feedthroughs 41 is provided to a two input multiplexor 42. This eliminates the increase in pitch of the functional unit 43 regardless of the number of entries in the annex 40. In addition, the number of inputs to the multiplexor 42 remains two regardless of the number of entries in the annex 40.

Similar to the previously described method, some capability is provided to determine which entry, if any, should be provided to the multiplexor 42. One way to do this involves the use of content addressable memory in the address field of the annex. Each entry in the annex stores an address field and a data field. The address field contains the address of the destination register, while the data field holds the results to be stored to that destination register. When attempting to determine if one of the operands is in the annex, the address of that operand is simultaneously compared to all of the addresses stored within the annex 40. If there is a match, the match line for that entry is asserted. It is possible that there may be more than one match in the annex 40 for any given operand. This would happen, for instance, if several instructions in a sequence all wrote to the same destination register. In that case, it is important that the most up-to-date or "youngest" entry in the annex 40 be sent back to the multiplexor 42.

Most instructions require more than one operand. For instance an add x,y,z instruction performs an addition of the contents of x to the contents of y and stores the result in z thus x and y are operand registers. Because it is possible that data destined for both x and y are in the annex 40, more than one compare port and set of match lines in the content addressable memory should be provided to allow simultaneous look-up for all the operands.

In order to resolve conflicts between multiple matches, a priority encoder circuit is used to allow only the youngest match to drive the bus connected to the multiplexor 42. However, the latency of a priority encoder increases as the number of entries in the annex 40 increases. Furthermore, the priority encoding is serial to the selection of the operands, and therefore cannot be removed from the critical path. Thus, the priority encode can add a prohibitive amount of delay.

The use of a special "young bit" is an alternative to using a priority encoder. As depicted in FIG. 5, each entry in the annex 50 has an additional bit 51 which is designated as the young bit 51 for that entry. For any given destination register address, there is only one entry in the annex whose young bit 51 is non-zero. That entry having a "true" logic value in the young bit 51 position contains the youngest and most up-to-date version of the data to be stored in that given destination register. All older versions for that given register address have deasserted young bits. Each entry also has a valid bit 52, which indicates whether or not the entry contains valid data which should be written to the destination register.

Using the young bit scheme, the match line for each entry in the annex is logically ANDed with the young bit and valid bit to create a "young match" signal for that entry. If there are multiple matches in the annex when an operand register address is applied to the content addressable address portion 53 of the annex, only one young match signal will be asserted at any given time. The increase in speed using the young bit scheme over the priority encoder scheme is at the expense of increased complexity in maintaining and updating the young bits 51.

A typical scheme for managing and updating the young bits 51 requires a comparison port in the content addressable memory portion 53 of the annex. The destination address for each instruction being executed in the functional unit is compared to the address portion of each entry 54 in the annex 50. For each entry 54 with a match, the young bit 51 is reset. Every new entry 55 in the annex 50 always enters the annex pipeline 50 with an asserted young bit 51, because the results of an instruction that has just been executed is always the youngest value for that destination register.

A fundamental difficulty in any pipelined processor involves the handling of conditional branches in the execution sequence. Most programs include frequent conditional branches. When executing such a program in a pipeline, there is no way to tell with certainty which instruction should be fetched for execution directly after the branch instruction because the execution sequence depends upon the results of the branch instruction. Since, in a pipelined processor, any instruction is not executed until several clock cycles after it is fetched, there is no way to decide with certainty which instruction should be fetched, dispatched, or for which execution should be started after the branch instruction.

A common way to handle this problem is to choose one possible execution sequence, hoping that the condition will be resolved such that the choice turns out to have been correct. In the case that the choice is incorrect, the processor must be able to recover from the misprediction. In many processors, this recovery calls for the voiding or aborting execution of all the instructions that were fetched, dispatched, or for which execution was started along the mispredicted execution path. All stages prior to the stage when the branch becomes resolved must be voided.

In a processor with an annex 50 that uses a young bit 51, however, the problem is more complicated. When a processor encounters a conditional branch, it must choose which segment of the code to prefetch. The prefetched instructions are subsequently executed speculatively until the branch is actually resolved. The branch resolution latency can be several cycles depending upon the degree of pipelining. Thus, it is possible for an instruction to be executed, the young bit 51 set in the annex 50 for the entry 55 containing that instruction's result, and then later it is determined that the branch prediction is incorrect. A significant consequence of setting the young bit 51 for a speculatively executed instruction is that the previously asserted young bit 51 for an entry 54 having the same destination address is cleared. In attempting to recover from the mispredicted branch, the previous values of the young bits 51 which existed prior to the mispredicted branch must be restored to the entries 54 of the annex 50.

Providing the capability to restore the previous state of the young bits 51 is a rather complicated task. One way to provide this capability is the maintenance of an elaborate pointer table. In this scheme, each annex entry 54 has a pointer which points to the next older entry 54 which shares the same destination register address. Since multiple assignments to the same register address may occur within a mispredicted branch, even the annex entries 54 with a reset young bit 51 must point to the next older entry 54 for that destination address, since it may be necessary to traverse more than one link of the list to find the youngest result which was not the result of an erroneous speculative execution. This solution is very expensive in terms of the hardware required to implement it.

SUMMARY OF THE INVENTION

The present invention is an apparatus and a method for performing restoration of the previous values of the young bits after either a mispredicted branch has been detected and speculative instruction results have been voided or a predicated instruction has been speculatively executed while its predicate indicates it should not have been executed.

According to a first embodiment of the present invention, after a mispredicted branch has been detected, the annex entries containing the speculative instruction results are invalidated. Beginning with the oldest annex entry, the destination register address of that entry is broadcast to all the other entries. The broadcast entry is simultaneously compared to the addresses of all the other entries. All annex entries with matching addresses have their young bits reset, while the young bit of the broadcast entry is set. The above broadcast, compare, reset, and set operations are performed on all the remaining valid entries sequentially and in order of decreasing age. When all valid entries have been broadcast, the young bit states are correctly reconstructed. This embodiment reconstructs the young bits using existing logic in the annex, and thus incurs no additional hardware costs.

According to a second embodiment, each annex entry has a current young bit (Y0), and one or more past young bits (Y1 through YN). For branch condition resolutions which take up to N clock cycles, N past young bits (Y1 through YN) are maintained in each annex entry. During every machine cycle in which a new annex entry is received, the current young bit (Y0) is shifted into the first past young bit position (Y1). Simultaneously, the contents of Y1 is shifted into Y2. Similarly, the contents of Yk is shifted into Yk+1 for all k from 0 to N−1. Also when a new annex entry is received, and the current young bits (Y0) are updated.

When a mispredicted branch is detected after the results of i speculative instructions have been entered into the annex, the past young bit in Yi is restored back into the current young bit Y0 for each annex entry. Thus, restoration of the correct young bits is performed in a small constant time.

Both embodiments may be implemented in the same processor to optimize the recovery from both long latency mispredictions and short latency mispredictions. The first embodiment is more suitable for long latency conditionals, while the second embodiment is more suitable for short latency conditionals. The preferred recovery method can be determined dynamically by the processor or statically based on the nature of the recovery.

DETAILED DESCRIPTION OF THE INVENTION

Figure 1:
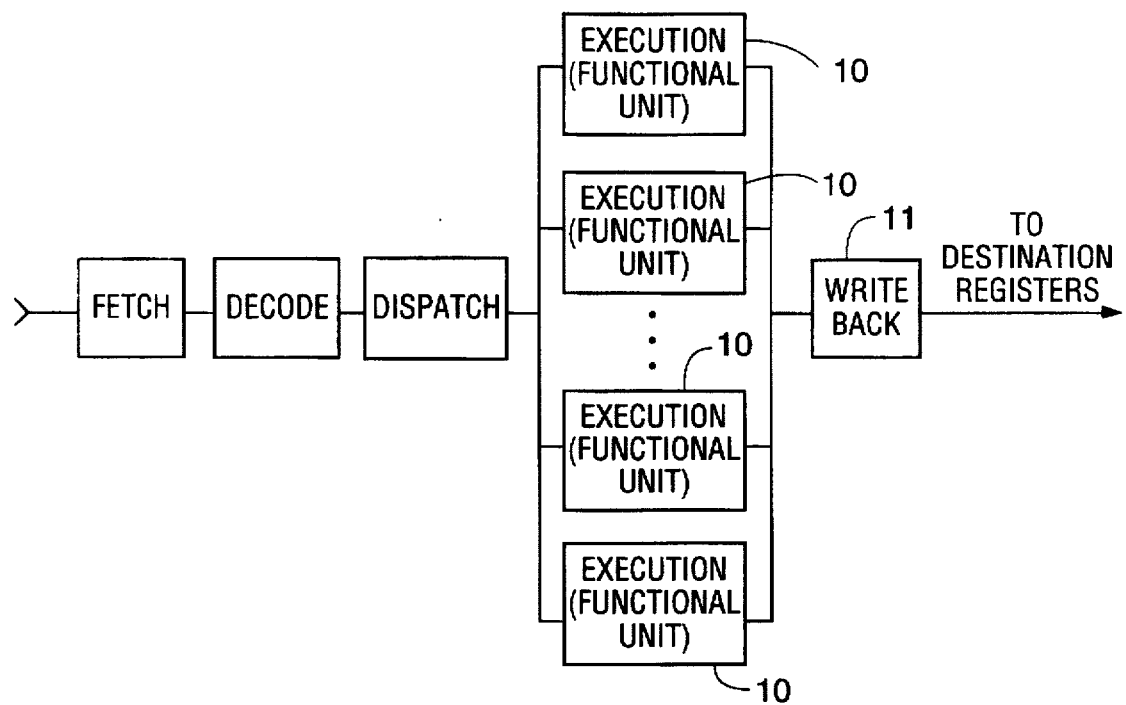
FIG. 1 illustrates a typical superscalar processor architecture.
Figure 2:
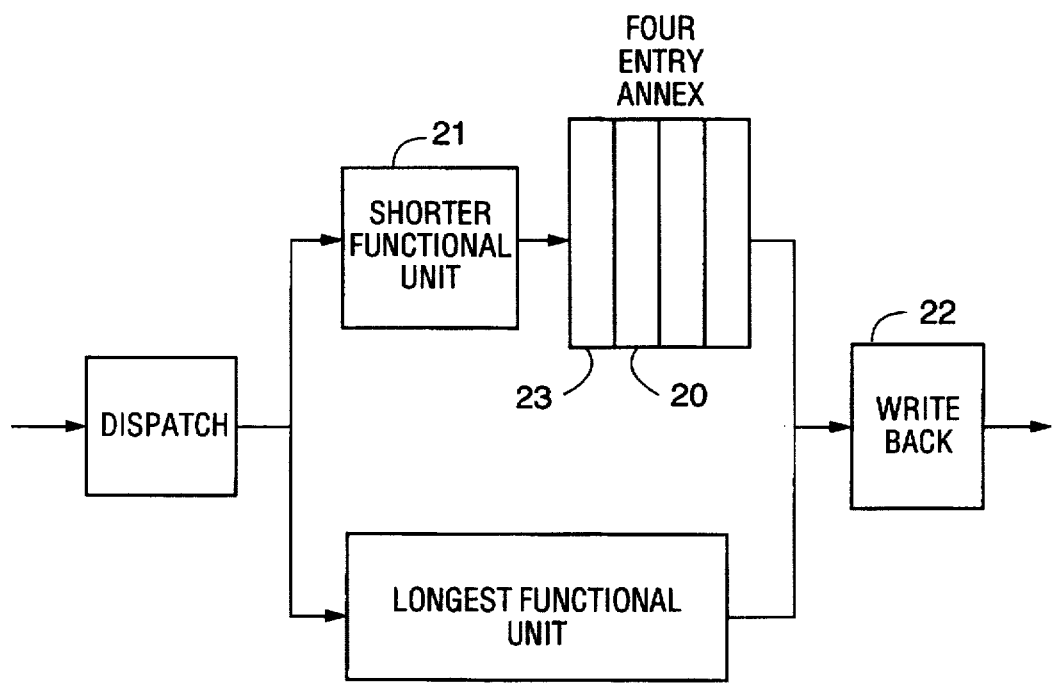
FIG. 2 illustrates a two-scalar execution block diagram in which one functional unit has less latency and thus has an annex.
Figure 3:
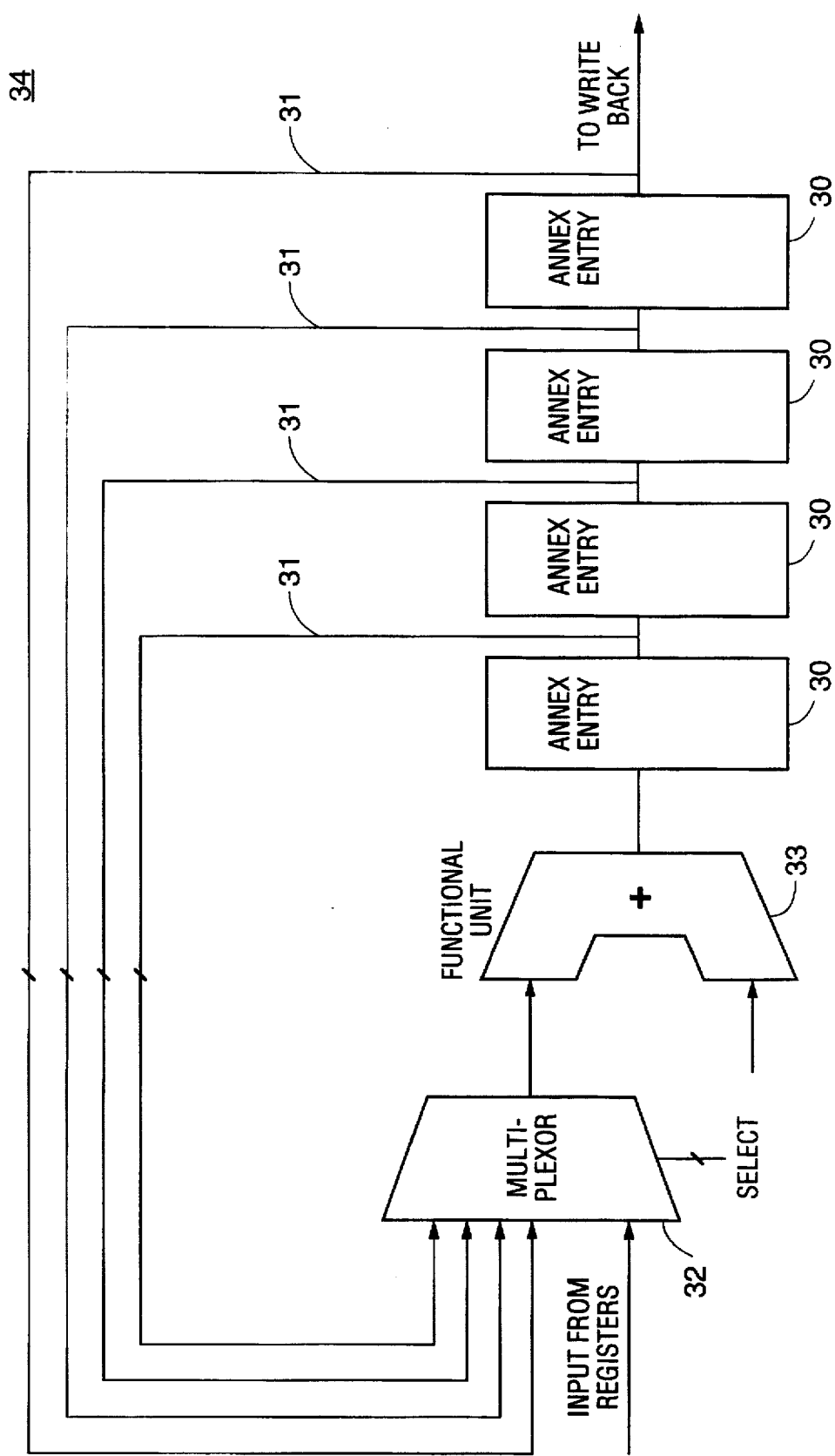
FIG. 3 depicts a prior art manner of providing the functional units with access to the contents of each entry in the annex.
Figure 4:
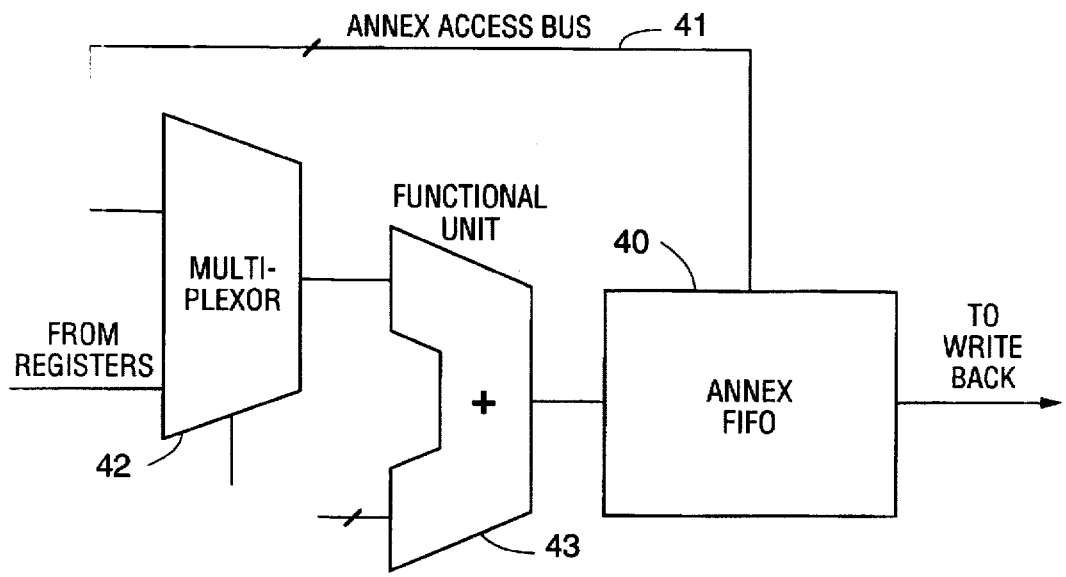
FIG. 4 depicts a second prior art manner of providing the functional units with access to the contents of each entry in the annex.
Figure 5:
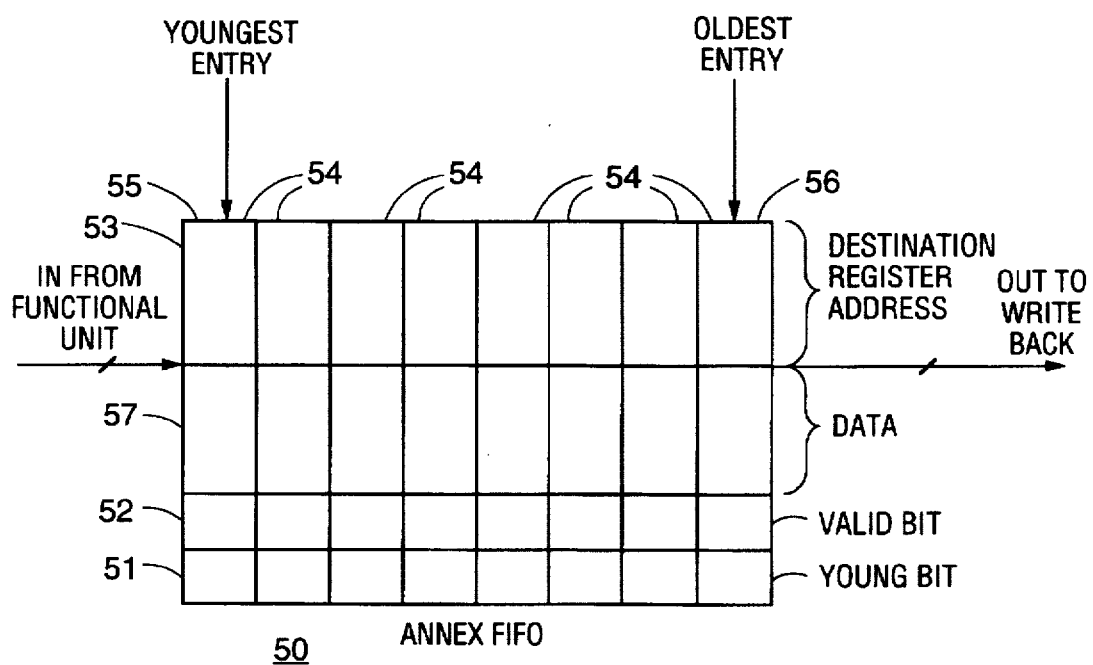
FIG. 5 shows the organization of data in an eight entry annex.

The present invention allows a relatively convenient way to perform restoration of the values of the young bits 51 in the entries of the annex prior to the mispredicted executions. FIG. 5 shows the data organization in the annex. The annex 50 can be implemented as a shift register. The results of newly executed instructions are shifted into leftmost entry 55 of the annex, and the oldest entries in the rightmost entry 56 are shifted out to the writeback stage. Each entry 54 stores the destination register address 53 and the data 57 to be stored to that register. Additionally, each entry 54 has a young bit 51 and a valid bit 52.

The valid bit 52 is used to indicate whether the data should actually be written into the register when the writeback stage is reached at the end of the annex pipeline 50. If the valid bit 52 for an annex entry 54 is set, the data 57 in that entry 54 is meaningful and will be stored to the register indicated by the address field 53. If the valid bit 52 is reset, however, the data 57 in that entry 54 is not meaningful and will not be stored to the register indicated by the address field 53. Not all instructions produce results which need to be written into a register; however, the entries of the annex must shift forward during every cycle so as to maintain a fixed time interval between execution and write back. Therefore, whenever an instruction is executed which produces no result, the youngest annex entry is marked invalid. The valid bit 52 provides a convenient way to flush the results of instructions which were executed as part of a mispredicted branch. Thus, deasserting the valid bit is a way to nullify entries. If the condition is resolved such that the execution of a sequence of instructions is an error, the results of those instructions can be invalidated or nullified simply by deasserting the valid bits 52 for those instructions.

In the following code fragment, a conditional branch occurs. The instruction "branch_0 14, target" means that if the contents of register 14 is non-zero, the next instruction to be executed should be the instruction at the target address. On the other hand, if the contents of register 14 are zero, then execution should continue sequentially with the next instruction after the branch instruction.

```
nor 11,14, 12
add 11,12, 13
or 11,13, 10
branch_0 14, target
move 11, 13
add 12,15, 17
...
target: add 13,14, 16
add 14,12, 15
```

Assume that the processor fetches the instructions directly after the conditional branch instruction. Furthermore assume that these instructions are speculatively executed. All of the instructions except the branch result in the assignment of a value to a register. Since the move instruction makes a second and later assignment to register 13, the young bit 51 for the previous assignment to register 13 has been deasserted. Since there are no older assignments to any of the other registers in the annex 50, all the other young bits 51 are asserted.

Figure 6:
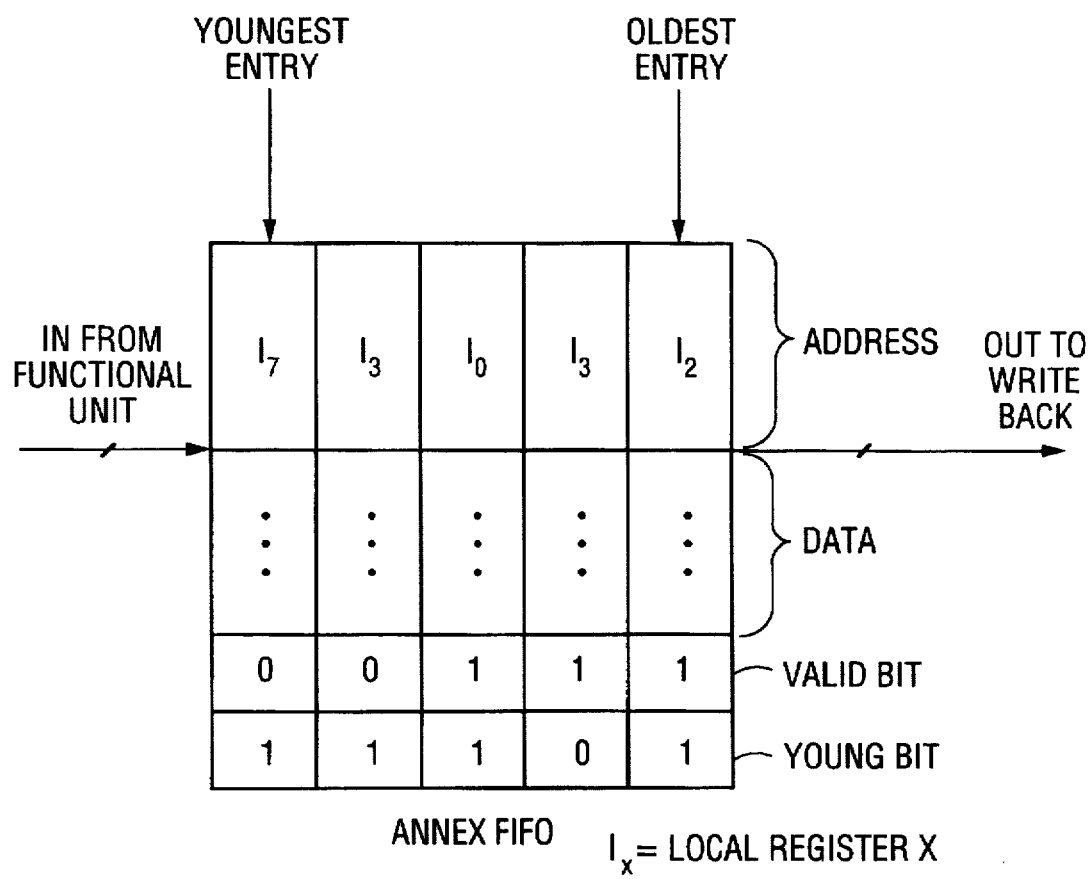
FIG. 6 shows a possible state of the annex when a mispredicted branch has been detected.

If the contents of register 14 turn out to be non-zero, then the speculative executions of the move and add instructions need to be reversed or voided. First, the valid bits 52 for the youngest two entries in the annex are deasserted. As a consequence of deasserting the valid bits 52 for these results, they are effectively flushed from the annex 50, since the write-back stage will not act upon them. The next task which must be performed is the restoration of the young bits 51 to the state in which they existed prior to the speculative executions. If the processor had a five-entry annex 50, the state of the annex would appear as shown in FIG. 6.

A destination register compare port exists in the annex. As an instruction is executed by a functional unit, that instruction's destination register address is applied to the compare port and is compared against the address fields of all the entries in the annex. The comparisons can all be done simultaneously if the address part of the annex is implemented as content addressable memory. For every annex entry that matches, the young bit is reset. When the instruction's results are calculated, they are entered into the annex with the young bit set. In this way, only the youngest data for that particular destination register which is newly produced from a functional unit has an asserted young bit.

Using a first embodiment of the present invention, the restoration of the state of the young bits after a mispredicted branch execution is performed sequentially using the same hardware that was used to originally set the young bits in the annex. The only significant modification to the hardware datapath is that each annex entry has the ability to drive the compare bus through the annex.

Once the entries of the annex corresponding to a mispredicted branch have been flushed by deasserting their respective valid bits, the recovery of the previous young bits is performed sequentially. The entry at the end of the annex pipeline is the oldest entry in the annex. Beginning with the oldest entry, the address in that entry is applied to the compare bus and is compared to all the other entries in the annex. The young bits of all entries with matching destination addresses are cleared except for the entry which is currently driving the compare bus. The young bit of the entry driving the bus is asserted.

After the oldest entry has driven the compare bus and affected the state of the young bits, the second oldest drives the compare bus and affects the young bits. This process is performed sequentially until all of the valid entries have driven the compare bus. Once the youngest valid entry has driven the compare bus, deasserted the young bits of those entries having matching destination addresses, and asserted its own young bit, the state of the young bits prior to the speculative executions has been completely reproduced. Those entries which were invalidated by deasserting their valid bits do not drive the compare bus. The young bits of those invalid entries may be affected by the sequential reconstruction, but this does not matter since essentially no hardware will pay any attention to them because they are invalid.

Since the reconstruction of the young bits was sequential, the amount of time necessary to reconstruct grows as the number of remaining valid entries grows. This scheme has the advantage that repair to the annex can be made while the correct instructions are being fetched. The total number of pipeline processor stages prior to the first stage which refers to the annex defines the number of valid entries whose young bits may be reconstructed with no overhead. If that number of processor stages preceding the functional unit is greater than or equal to the number of remaining valid entries in the annex, then the reconstruction of the young bits can always occur during the time when the correct instructions are being fetched and processed in the pipelined processor even if each individual step in the sequential reconstruction takes one full clock cycle. Once a misprediction is detected to have occurred, the processor can fetch the correct instruction beginning in the next cycle. However, that correct instruction will not reach the functional unit until it has worked its way through the preceding pipeline stages. Thus, the annex has that predetermined amount of time to reconstruct its young bits.

One of the consequences of performing sequential recovery as described is that the sooner a condition is resolved, the longer it takes to reconstruct the young bits of the annex. This paradox is a result of the fact that if the condition is quickly resolved, fewer of the annex entries are invalidated, and more steps in the sequence must be performed. In the worst case if only one speculative instruction is executed before the condition is resolved, all but one of the annex entries must drive the compare bus in order to reconstruct the young bits. Conversely, if nearly all of the entries of the annex are invalidated speculative instruction results, the reconstruction of the young bits takes relatively little time, since only the oldest few of the entries are valid, and only a few steps of the sequence need to be performed.

Figure 7:
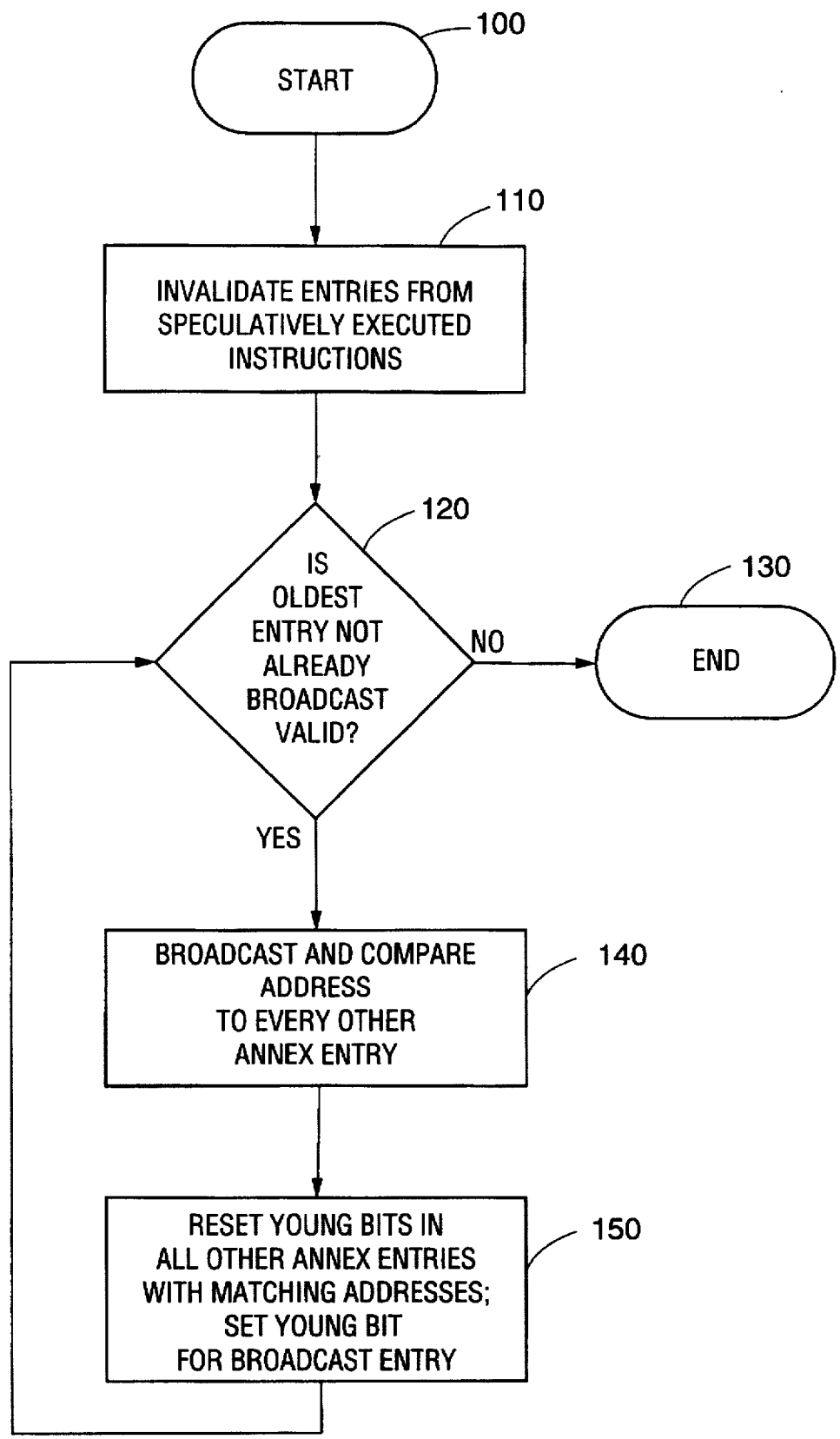
FIG. 7 is a flowchart of the steps used to implement the first embodiment of the present invention.

FIG. 7 illustrates the sequential method for restoring the state of the young bits. The start step 100 is reached when a condition has been resolved such that the speculative execution sequence was incorrect. At step 110, the results of the speculative execution which are resident in some of the youngest (leftmost) entries of the annex are invalidated by deasserting their valid bits. Step 120 is a test to determine if all the valid entries have been acted upon. Once each remaining valid entry has broadcast its address to all the other entries, thus updating the state of the young bits, the restoration of the young bits is complete. The steps of the sequential restoration begin with the rightmost (oldest) entry of the annex (illustrated in FIG. 6) and proceed through the leftmost (youngest) valid entry (illustrated in FIG. 6). The first invalid entry is one entry younger than the youngest valid entry. When the first invalid entry is reached, the restoration is complete and the completion stage 130 is reached.

In step 140, the destination register address of the oldest valid entry that has not already been broadcast to every other entry is broadcast to every entry. In step 150, for those annex entries whose destination address matches that of the address being broadcast, the young bits are deasserted or reset. The young bit of the entry whose address is being broadcast is asserted or set. The order in which the resetting and setting occurs is not important.

The pipelined processor architecture may be such that the number of entries in the annex is excessively large. Alternatively, there may be too few front-end pipeline stages to provide enough time to sequentially reconstruct the young bits. In either case, the sequential method of young bit reconstruction will cause delays in processing. In order to avoid such delays, the second embodiment of the present invention can be used.

Figure 8:
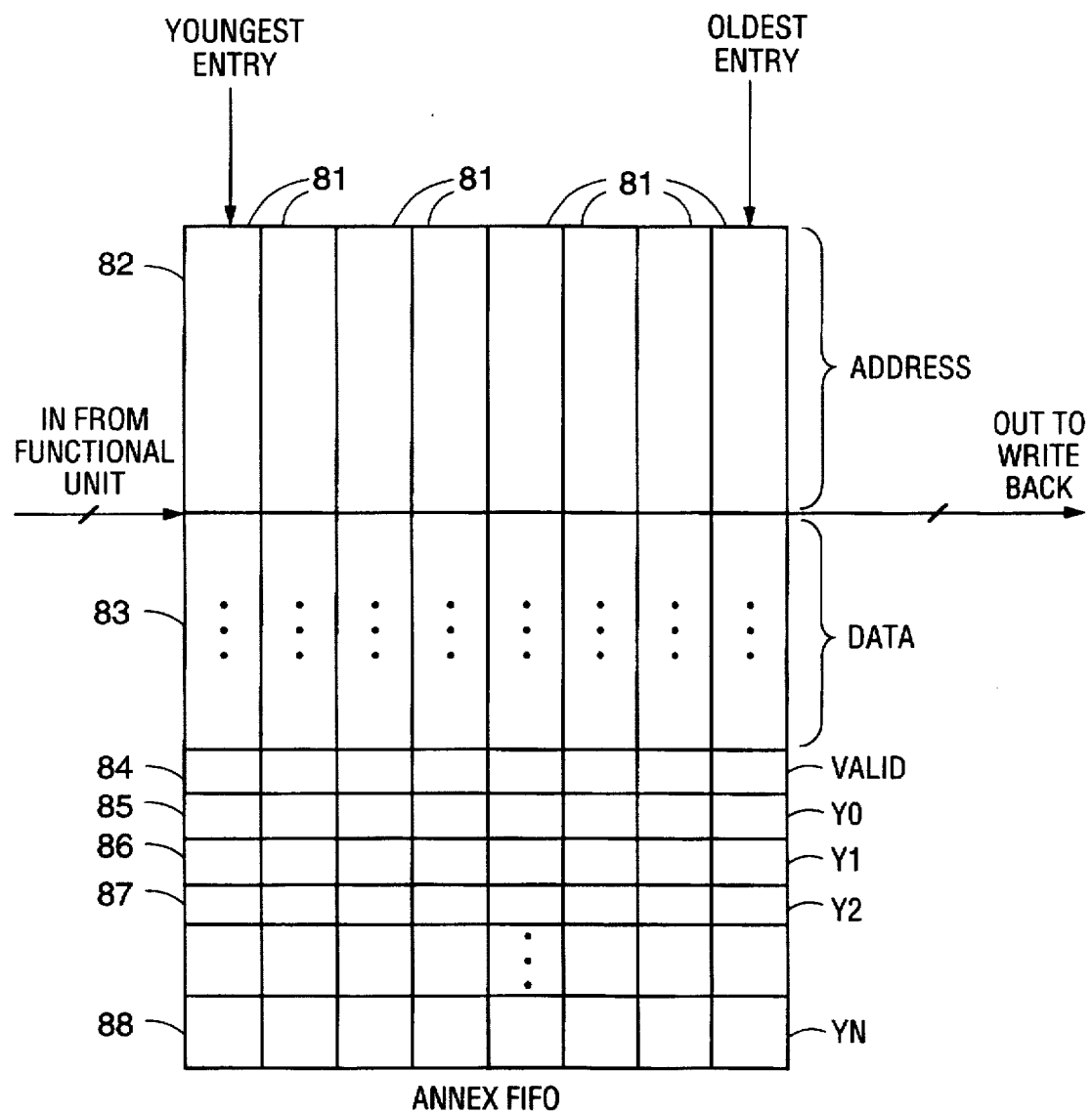
FIG. 8 shows the organization of data in an eight entry annex having storing N previous young bit states according to a second embodiment of the present invention.

A second embodiment of the present invention allows reconstruction of the young bits when the branch conditions are resolved with low latency. In such cases, relatively few of the young entries of the annex need to be invalidated. This embodiment is most useful when there are some branch conditions which can be resolved in a small number of clock cycles. FIG. 8 shows the organization of information in the annex 80 according to this second embodiment of the present invention in which branch conditions are resolved no later than N clock cycles after the speculative execution has begun.

Each annex entry 81 has a destination address field 82 to which the contents of the data field 83 will be stored for each valid entry by the write-back stage at the end of the annex pipeline 80. The valid bit 84 in each entry specifies whether or not that entry is valid, and thus should actually be stored to the destination register in the write-back stage at the end of the annex pipeline 80. Each annex entry has a current young bit 85; this field is labeled Y0. Additionally, each annex entry 81 has previous young bit field 86 labeled Y1. The operation of a system using the second embodiment will be described where N is two. If N=2, the system is designed to handle two clock cycle condition resolution. Thus, only two additional bits (Y1 and Y2) per entry are added to the annex 80. The bit field labeled Y1 86 is the previous state of the young bits during the last clock cycle. The bit field labeled Y2 87 is the next older previous state of the young bits that existed two cycles prior.

Every time an instruction is executed by a functional unit, the destination register address for that instruction is compared to all of the destination register addresses stored in the address field 82 of the annex entries 80. Only when there is a match or hit in the annex 80 does one of the previously existing current young bits 85 stored in the Y0 bit position change in the annex 80. In this case when a destination register address match causes one of the Y0 bits in the annex 80 to change from assertion to deassertion, the previous state of the Y0 bit fields 85 are stored into the Y1 bit positions of each entry 81 in the annex 80. When there is not a match in the annex of the currently executing instruction's destination register address, the state of the Y0 bits 85 are stored into Y1 86 even though they are identical to those in Y0 85. The fact that Y0 and Y1 are identical is a result of the fact that if a speculative execution needs to be voided and there was no destination register address match for that speculatively executed instruction, the previous state of the young bits is equal to the current state for those entries in the annex 80 that remain valid. Thus, the values in Y0 85 are stored into Y1 86 every clock cycle. Similarly, the young bit values in Y1 86 are stored into Y2 87 during each clock cycle. Therefore, Y0 85 contains the current state of the young bits, Y1 86 contains the state of the young bits one clock cycle ago, and Y2 87 contains the state of the young bits two clock cycles ago.

Whenever a mispredicted branch occurs, some of the entries 81 in the annex 80 are invalidated, and the state of the young bits 85 must be restored. If the branch is resolved in the next clock cycle, the Y1 young bits 86 are copied into the Y0 position 85 for each entry 81 in the annex 80. If it takes the full two cycles to resolve the branch, the Y2 young bits 87 are copied into the Y0 bit position 85 to restore the current Y0 young bits 85 to their correct values.

In this implementation, one of the premises of the design was that conditional branches could be resolved within two clock cycles. Therefore, no more than two previous states of the young bit 85 for each entry 81 need to be stored, because all branches will be resolved by at most two clock cycles. In this example, at most two entries 81 in the annex 80 will be invalidated because the branch resolution latency is at most two cycles.

The above methodology of the second embodiment can be extended to processor implementations in which up to N cycles are required to resolve conditions. If up to N cycles are required to resolve conditions, N young bit fields need to be added to each entry 81 of the annex 80. Since the N speculatively executed instructions could each store to a destination register address which is already in the annex 80, it is possible that an N-deep stack of previous young bit values need to be stored in each annex entry 81 in order to guarantee that the appropriate state of the young bits is available for restoration. Thus, each annex entry 81 would have the current young bit field Y0 85 as well as previous young bits Y1, Y2, . . . YN 88.

Figure 9:
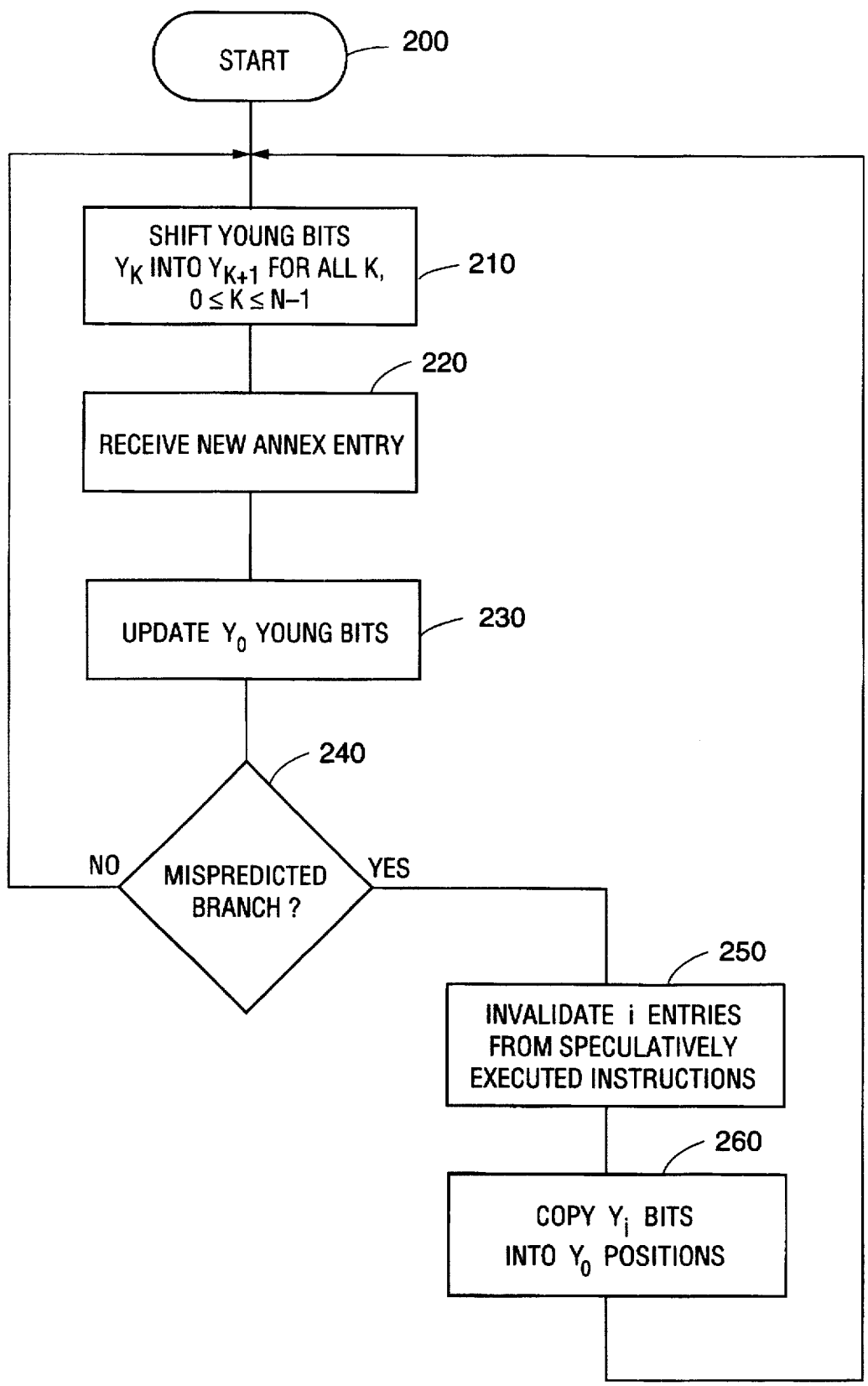
FIG. 9 is a flowchart of the steps used to implement the second embodiment of the present invention.

FIG. 9 illustrates the method of maintaining and restoring the young bits according to the second embodiment. Step 200 indicates the initial entry point into the infinite loop which will be performed as long as the processor is running. In step 210, the current state of the young bits (Y0) is stored into the position for the previous young bits Y1. Simultaneously, the previous young bits Y1 are shifted into the Y2 position. Similarly, the bits in Y2 are shifted into Y3. Since the oldest state of the young bits to be stored is YN, YN can not be stored into YN+1. Instead, YN is discarded. However, the discarding of the YN bits is not problematic, because even if the instruction which produced the entry N cycles ago was speculatively executed, the contingency has been resolved by that time.

In step 220, a new entry is received into the annex pipeline from a functional unit. In step 230, the current young bits Y0 are updated. The newest entry which just entered the annex always has its young bit set. The young bits of any entries having the same destination register address as the newest entry are reset.

In step 240, a test is performed to see if a mispredicted branch has been encountered. If no mispredicted branch is detected, the process reverts back to step 210. If a mispredicted branch occurs, the process flow proceeds to step 250. Here, i indicates the number of entries resident in the annex which were the result of speculatively executed instructions. If all instructions result in an annex entry, this means the conditional branch which is just now being resolved occurred i clock cycles ago. The i speculatively executed instructions are invalidated by resetting their valid bits. At step 260, the correct young bits are restored by copying young bits from the position Yi into the Y0 position for each entry in the annex. The process then reverts back to step 210.

For a given architecture, the restoration of the young bits using this second embodiment requires a constant amount of time regardless of the number of invalidated speculatively executed results. Furthermore, this constant amount of time is small since essentially the only significant operation is the transferring of the bit values from position Yi into position Y0.

In the extreme case in which all conditions were known to be resolved in only one clock cycle, then only one additional young bit Y1 per entry would need to be supplemented to the current young bit Y0. This is the case, for example, for a predicated instruction, such as a conditional move. A predicated instruction conditionally executes based upon some existing state in the machine. For instance, it might execute only if a certain condition code exists in some special status registers of the processor. In that case, there is no separate branch instruction in the instruction stream, but instead is an implied condition in an individual instruction.

In the case that more is known about the resolution time for branches and the nature of the sequence of instructions, other optimizations can be made. For examples if it is known exactly how many cycles every condition will require to be resolved and that no additional branches will be acted upon by the functional unit during this resolution time, only one additional set of young bits needs to be provided in each annex entry. The copying of the current young bit state into the previous young bit position would only occur directly before the speculative results entered the annex. As another example, if the maximum number of destination address matches (those instructions that affect the current state of the young bits) that could occur during the resolution of the a condition was known to be less than the number of cycles required for condition resolution, then the number of extra young bits provided for storage in each annex entry could be reduced accordingly at the expense of slightly more complicated control logic.

In a typical processor architecture, it might be prudent to implement both embodiments simultaneously. The sequential method of the first embodiment is faster when the condition resolution latency is higher, resulting in relatively more invalidated entries and relatively fewer remaining valid entries. The second embodiment using supplemental young bits is most efficient when the condition resolution latency is lower, resulting in relatively fewer invalidated entries and relatively more valid entries. In order to handle graceful recovery from both short and long mispredicted branches without stalling the processor or increasing the hardware costs very much, it may be advantageous to use the embodiments as alternatives to each other in the same annex structure. The sequential method would be used for longer mispredicted branches, and the supplemental young bit method would be used for shorter mispredicted branches. The recovery mechanism utilized would be dynamically controlled dependent upon the type of branch or predicated instruction or statically controlled based upon the nature of the recovery.

While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

What is claimed is:

1. A method of reconstructing young bit values after speculatively executing instructions following a mispredicted branch in a post-functional unit annex having a plurality of entries, wherein each entry includes address, data, and young bit information, comprising steps of:

(a) invalidating the instruction results in a post-functional unit annex after the mispredicted branch;

(b) broadcasting to every other valid annex entry for comparison a destination address of an oldest valid annex entry which has not previously been broadcast;

(c) comparing the destination address of the oldest valid annex entry which has not previously been broadcast to every other destination address of every other valid annex entry;

(d) resetting the young bit in each valid annex entry in which the destination address of the oldest valid annex entry which has not previously been broadcast equals the destination address in that valid annex entry;

(e) setting the young bit in the oldest valid annex entry whose destination address has not previously been broadcast; and (f) repeating steps b through e once for each valid annex entry ending with the youngest valid annex entry.

2. A method as in claim 1, wherein step b further comprises:

broadcasting to every invalid annex entry for comparison the destination address of the oldest valid annex entry which has not previously been broadcast.

3. A method as in claim 1, wherein step c further comprises:

comparing the destination address of the oldest valid annex entry which has not previously been broadcast to every destination address of every invalid annex entry.

4. A method as in claim 1, wherein step d further comprises:

resetting the young bit in each invalid annex entry in which the destination address of the oldest valid annex entry which has not previously been broadcast equals the destination address in that invalid annex entry.

5. A method of maintaining young bit information in a post-functional unit annex having a plurality of entries, wherein each entry has a current young bit storage position and a past young bit storage position, comprising steps of:

storing contents of the current young bit storage position into a past young bit storage position prior to the receiving of a new entry into the post-functional unit annex; and copying the contents of the past young bit storage position into the current young bit storage position when a mispredicted branch has been detected.

6. A method as in claim 5, further comprising the step of:

updating the current young bit after a new entry has been received into the annex.

7. A method of maintaining young bit information in an annex having a plurality of entries, wherein each entry has a current young bit storage position (Y) and N past young bit storage positions (Y through Y), comprising steps of:

for each x, wherein x is between 0 and N−1, inclusive, storing the contents of Y into Y for each annex entry prior to the receiving of a new entry into the post-functional unit annex; and copying the contents of one of the past young bit storage positions into Y for each annex entry when a mispredicted branch has been detected.

8. A method as in claim 7, wherein in the copying step, Y is the past young bit storage position copied into Y, where i is a number of annex entries invalidated by detection of the mispredicted branch.

9. An apparatus for reconstructing young bit values after speculatively executing instructions following a mispredicted branch in a post-functional unit an annex having a plurality of entries, wherein each entry includes address, data, and young bit information, comprising:

(a) an invalidation circuit for invalidating the instruction results in a post-functional unit annex after the mispredicted branch;

(b) a broadcast circuit for broadcasting to every other valid annex entry for comparison a destination address of an oldest valid annex entry which has not previously been broadcast;

(c) a compare circuit for comparing the destination address of the oldest valid annex entry which has not previously been broadcast to every other destination address of every other valid annex entry;

(d) a deassertion circuit for resetting the young bit in each valid annex entry in which the destination address of the oldest valid annex entry which has not previously been broadcast equals the destination address in that valid annex entry;

(e) an assertion circuit for setting the young bit in the oldest valid annex entry whose destination address has not previously been broadcast; and (f) a repetition circuit for reactivating elements b through e once for each valid annex entry ending with the youngest valid annex entry.

10. An apparatus as in claim 9, wherein component b further comprises:

a broadcast circuit for broadcasting to every invalid annex entry for comparison the destination address of the oldest valid annex entry which has not previously been broadcast.

11. An apparatus as in claim 9, wherein component c further comprises:

a compare circuit for comparing the destination address of the oldest valid annex entry which has not previously been broadcast to every destination address of every invalid annex entry.

12. An apparatus as in claim 9, wherein component d further comprises:

an deassertion circuit for resetting the young bit in each invalid annex entry in which the destination address of the oldest valid annex entry which has not previously been broadcast equals the destination address in that invalid annex entry.

13. An apparatus as in claim 11, wherein the compare circuit for comparing is a content addressable memory.

14. A method as in claim 8, further comprising the step of:

for each z, wherein z is between 1 and N−i, inclusive, storing the contents of $Y\{z+i\}$ into $Y\{z\}$ when a mispredicted branch has been detected.

15. An apparatus for maintaining young bit information in a post-functional unit annex having a plurality of entries, wherein each entry has a current young bit storage position and a past young bit storage position, comprising:

a storage circuit for storing contents of the current young bit storage position into a past young bit storage position prior to the receiving of a new entry into the post-functional unit annex; and a copy circuit for copying the contents of the past young bit storage position into the current young bit storage position when a mispredicted branch has been detected.

16. An apparatus as in claim 15, further comprising:

an update circuit for updating the current young bit after a new entry has been received into the annex.

17. An apparatus for maintaining young bit information in an annex having a plurality of entries, wherein each entry has a current young bit storage position (Y) and N past young bit storage positions (Y through Y), comprising:

for each x, wherein x is between 0 and N−1, inclusive, a storage circuit for storing the contents of Y into Y for each annex entry prior to the receiving of a new entry into the post-functional unit annex; and a copy circuit for copying the contents of one of the past young bit storage positions into Y for each annex entry when a mispredicted branch has been detected.

18. An apparatus as in claim 17, wherein in the copy circuit for copying, Y is the past young bit storage position copied into Y, where i is a number of annex entries invalidated by detection of the mispredicted branch.

19. An apparatus as in claim 18, further comprising:

for each z, wherein z is between 1 and N−i, inclusive, a storage circuit for storing the contents of $Y\{z+i\}$ into $Y\{z\}$ when a mispredicted branch has been detected.

20. A method of reconstructing young bit values after speculatively executing n instructions following a mispredicted branch in an annex having a plurality of entries, wherein each entry includes address, data, and a current young bit storage position ($Y\{0\}$) and N past young bit storage positions ($Y\{1\}$ through $Y\{N\}$), comprising steps of:

invalidating the n speculatively executed instructions in a post-functional unit annex after the mispredicted branch;

if n is greater than N;
- (a) broadcasting to every other valid annex entry for comparison a destination address of an oldest valid annex entry which has not previously been broadcast,
- (b) comparing the destination address of the oldest valid annex entry which has not previously been broadcast to every other destination address of every other valid annex entry,
- (c) resetting the young bit in each valid annex entry in which the destination address of the oldest valid annex entry which has not previously been broadcast equals the destination address in that valid annex entry,
- (d) setting the young bit in the oldest valid annex entry whose destination address has not previously been broadcast, and
- (e) repeating steps a through d once for each valid annex entry ending with the youngest valid annex entry; and when n is less than or equal to N;
- (f) copying the contents of Y{n} into Y{0} for each annex entry when a mispredicted branch has been detected.

* * * * *

UNITED STATES PATENT AND TRADEMARK OFFICE
CERTIFICATE OF CORRECTION

PATENT NO. : 5,748,935
DATED : May 5, 1998
INVENTOR(S) : MARC TREMBLAY ET AL.

It is certified that error appears in the above-identified patent and that said Letters Patent is hereby corrected as shown below:

In Col. 14, line 52, delete "Y" and insert --Y[i]--.
In Col. 14, line 5, delete "Y" and insert --Y[0]--.

In Col. 13, line 35, delete "Y" and insert --Y[i]--.
In Col. 13, line 36, delete "Y" and insert --Y[0]--.

Signed and Sealed this

Twenty-ninth Day of September, 1998

Attest:

BRUCE LEHMAN

*Attesting Officer*                *Commissioner of Patents and Trademarks*

UNITED STATES PATENT AND TRADEMARK OFFICE
CERTIFICATE OF CORRECTION

PATENT NO. : 5,748,935
DATED : May 5, 1998
INVENTOR(S) : MARC TREMBLAY ET AL.

It is certified that error appears in the above-identified patent and that said Letters Patent is hereby corrected as shown below:

Col. 13, line 26, delete "(Y)" and insert --(Y{0})--.
Col. 13, line 27, delete "(Y through Y)" and insert --(Y{1} through Y{N})--.
Col. 13, line 29, delete "Y into Y" and insert --Y{x} into Y{x+1}--.
Col. 13, line 33, delete "Y" and insert --Y{0}--.

Col. 14, line 42, delete "(Y)" and insert --(Y{0})--.
Col. 14, line 43, delete "(Y through Y) and insert --(Y{1} through Y{N})--.
Col. 14, line 45, delete "Y into Y" and insert --Y{x} into Y{x+1}.
Col. 14, line 49, delete "Y" and insert --Y{0}--.

Signed and Sealed this

Eighth Day of December, 1998

Attest:

*Attesting Officer*

BRUCE LEHMAN

*Commissioner of Patents and Trademarks*